April 21, 1970 H. H. PRINCEN 3,507,006
APPARATUS FOR PRODUCING THERMOPLASTIC FILM
Filed June 26, 1968 4 Sheets-Sheet 1

INVENTOR:
HERMANUS H. PRINCEN
BY: *Martin S. Baer*
HIS ATTORNEY

INVENTOR:
HERMANUS H. PRINCEN
BY:
HIS ATTORNEY

United States Patent Office 3,507,006
Patented Apr. 21, 1970

3,507,006
APPARATUS FOR PRODUCING THERMOPLASTIC FILM
Hermanus H. Princen, Delft, Netherlands, assignor to Shell Oil Company, New York, N.Y., a corporation of Delaware
Filed June 26, 1968, Ser. No. 740,354
Claims priority, application Great Britain, June 26, 1967, 29,290/67
Int. Cl. B29d 23/00
U.S. Cl. 18—14        10 Claims

ABSTRACT OF THE DISCLOSURE

An apparatus for extruding lay-flat thermoplastic film from an annular die as an inflated tubular film bubble comprises means for cooling the bubble by a concurrent flow of gaseous cooling fluid confined in a passage between the bubble and a guide means. The guide means is of a construction which permits its shape to be varied by adjusting means. The shape of the guide means and consequently the flow path of said gaseous cooling fluid can thus be varied to provide efficient cooling for bubbles of various dimensions at various production rates.

BACKGROUND OF THE INVENTION

The invention relates to a device and method for cooling extruded blown tubular thermoplastic film.

A method is known for producing thermoplastic film by the extrusion of a thin-walled thermoplastic tube through an annular orifice. Directly upon leaving the extrusion orifice the tubular film is expanded by creating a pressure difference between the inner and outer space of the film tube, while the material of the tube is cooled by contacting its surface with a stream of gaseous cooling fluid, typically air, supplied by a cooling ring surrounding the tube. The cooled and expanded film tube passes between rolls for flattening the tube and is then slit lengthwise and unfolded to form a single sheet of film.

Prior art directed to this so-called blown-film method for production of lay-flat film is represented by U.S. 2,461,975 to Fuller. In certain improvements of the method, illustrated by U.K. Patent 1,006,573 and French Patent 1,423,754, gaseous cooling fluid passes in cocurrent flow in the direction of film movement, confined between the blown film tube and a guide wall.

The air used for cooling the freshly extruded film tube is discharged from the cooling ring through one or more openings therein. These openings are usually one or more narrow annular slits surrounding the extruded tube. The air may be discharged from the cooling ring to impinge upon the surface of the film tube, or may be directed predominantly in a direction parallel to the surface of the tube. In both cases, once the air has been discharged through the air slits of the cooling ring it is guided along the surface of the tube by means of a guide wall. The guide wall may be formed by an annular wall element mounted coaxially in front of the cooling ring. The initial part of the guide wall may be formed by the inner wall of the cooling ring facing the tubular film. The guide wall can be shaped according to requirements, and may thus have a cylindrical, conical, convex or concave surface, or a combination of these. The shape of the guide wall is of particular importance if it is desired to reduce the pressure around the film tube in order to provide, or to assist in providing, the pressure differential over the inner and outer space of the tube so as to cause it to expand. For this puprpose the guide wall is preferably so shaped that the annular conduit for the cooling air formed between the film tube and the guide wall comprises a restriction or throat, so that the stream of cooling air on passing the throat reduces the pressure therein by venturi action.

The shape and position of the annular conduit for the cooling air around the film tube greatly influence the dynamics of the air stream, which in turn is of great importance in the control of the production method and the cooling efficiency obtained. Therefore, if operating conditions are changed, for example by using an extrusion orifice of different diameter or width, by changing the production speed or extrusion temperature, or by applying a different blow-up ratio of the tube, the cooling ring, or at least the guide wall thereof, must also be replaced. Furthermore, it is difficult to design guide walls for highest cooling efficiency and greatest possible production speed, except by trial and error.

OBJECTS AND SUMMARY OF THE INVENTION

It is the object of this invention to provide a device for cooling extruded tubular thermoplastic film which can be used under different process conditions and which is adapted to perform well under each of these conditions.

Accordingly, the invention provides in a preferred embodiment a device for cooling an extruded tubular thermoplastic film comprising a cooling ring adapted to supply a stream of gaseous cooling fluid circumferentially around the surface of the tubular film through one or more discharge openings in the ring, an annular guide wall mounted coaxially with the cooling ring for guiding the cooling fluid from the cooling ring along the tubular film, at least a portion of the guide wall being mounted adjustably in a manner not affecting the size and position of the said discharge openings in the cooling ring, and adjustment means for varying the position of the adjustable portion of the guide wall while maintaining the coaxial relationship thereof with the cooling ring.

The invention has the advantage that without changing from one type of guide wall to another (or without changing from one cooling ring to another) the most desirable shape of the guide wall can be selected experimentally in a quick and effective manner. It is an important advantage that the shape of the guide wall can be modified during the extrusion process, i.e., without the need to interrupt the extrusion for mounting of interchangeable parts.

In the device of the invention, the guide wall can be adjusted independently of the part of the cooling ring in which the discharge openings for the cooling air are located, so that the guide wall can be adjusted without affecting the supply of cooling air. This distinguishes the device of the invention from known cooling rings in which the inner face of the cooling ring can be adjusted only to change the size or position of the air openings formed in or by the inner face. In order to maintain uniform flow conditions over the circumference of the film tube it is necessary that the guide wall always be maintained in a coaxial relationship with the film tube. Therefore the device of the invention is so constructed that the guide wall is adjustable from one coaxial position to another. Thus the invention is not typically directed to an adjustment mechanism for bringing the guide wall from an eccentric to a coaxial position, like centering screws.

The invention also comprises a process for cooling extruded tubular thermoplastic film by means of the above device, in which a pressure difference is maintained between the inner and outer space of the tubular film directly upon its extrusion for expansion of the tubular film, and in which the surface of the expanding portion of the tubular film and the guide wall of the device between them form an annular passage including a throat-like restriction for the flow of cooling fluid therethrough.

BRIEF DESCRIPTION OF THE DRAWING

The invention will be explained further by reference to the accompanying diagrammatic drawing, which shows in.

DESCRIPTION OF THE PREFORMED EMBODIMENTS

Figure 1:
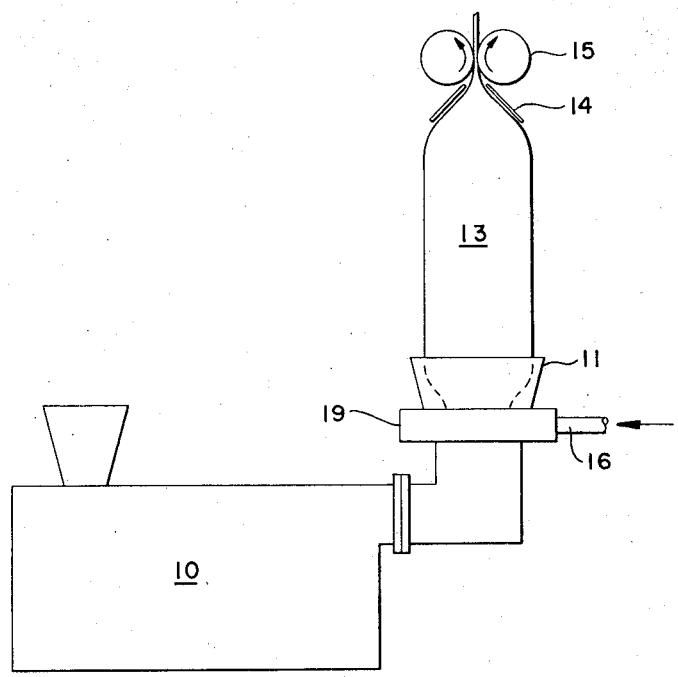
FIG. 1 an apparatus for producing tubular film by extrusion.

In FIG. 1 is illustrated an extruder 10, which produces a tubular film 13 through an annular orifice in the die head of the extruder. The tubular film on being extruded is inflated with air supplied through a conduit in the die head, whereby the tube expands while it is being cooled at its peripheral surface by cooling air blown from a cooling ring 19 which surrounds the tubular film in coaxial position therewith. The cooling ring is shown schematically. In the various figures of the drawing, different designs of the cooling ring are illustrated. The cooled and expanded tubular film 13 is flattened between flattening boards 14 and drawn forward between rotating drawing rolls 15 which at the same time collapse the tubular film at this point to maintain the inflation air within the tube.

Cooling ring 19 is mounted on the die end of the extruder so that the hot film material is immediately contacted with cooling air blown by this ring 19. The air is supplied to cooling ring 19 through an air supply tube 16. In cooling ring 19 the air is uniformly distributed over the circumference of the ring to produce a uniform flow of cooling air around the film tube. On its way along the film tube the cooling air is guided by an annular guide wall 11 mounted coaxially around the film tube and defining therewith an annular flow path for the air. The required shape of this annular flow path is dependent on such conditions as the wall thickness and temperature of the thermoplastic film and the blow-up ratio (ratio of the expanded film tube diameter to the extrusion orifice diameter of the film).

Figure 2:
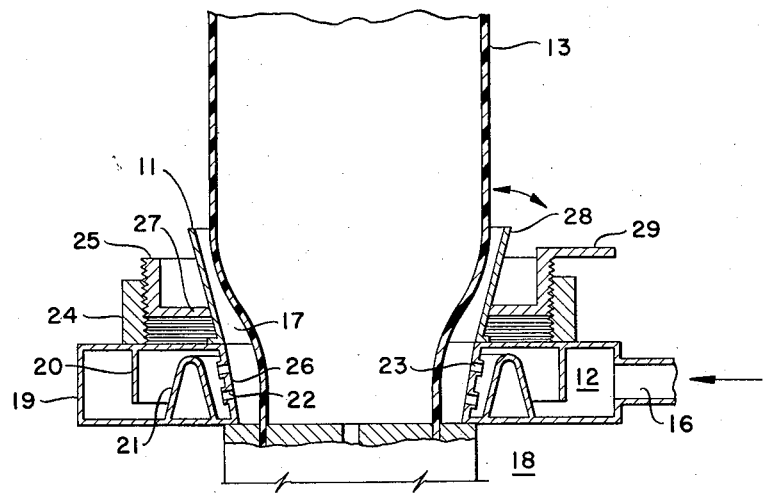
FIG. 2 one type of the cooling device of the invention, in vertical section.
Figure 3:
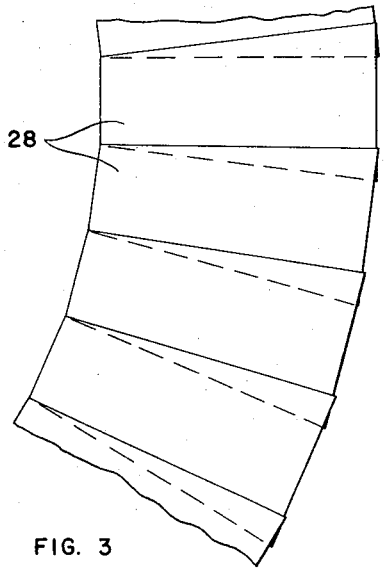
FIGS. 3–4 a fragment of the guide wall of the cooling device of FIG. 2, in top plan view and in vertical section, respectively.
Figure 4:
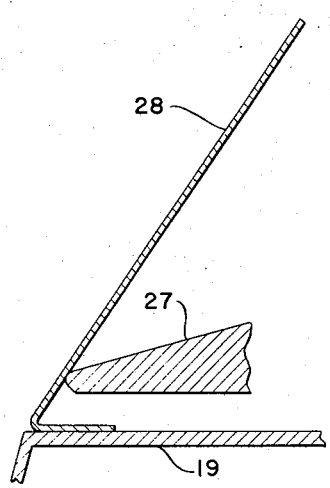
Figure 5:
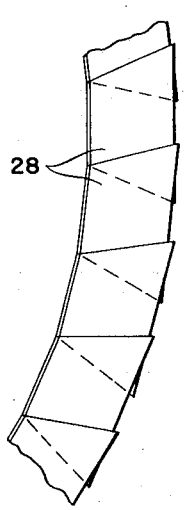
FIGS. 5–6 the same as FIGS. 3–4 but with the guide wall in a more erect position, and FIGS. 7–11 fragmentary views of various embodiments of the cooling device of the invention, in vertical section.
Figure 6:
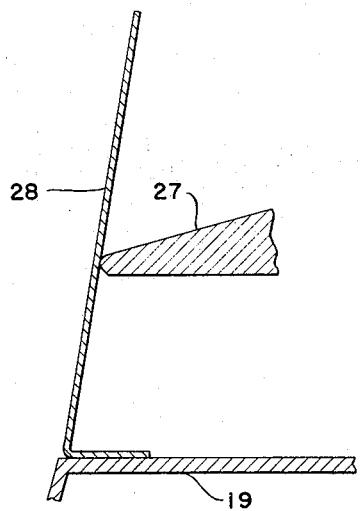

Cooling ring 19 and guide wall 11 are shown separately in FIG. 2. Cooling ring 19 comprises an annular chamber 12 to which the air supply tube 16 is connected. The inner face 26 of the air chamber 12 directly opposite the film tube 13 comprises a lower and an upper annular air slit 22 and 23, respectively. In chamber 12 an annular baffle plate 20 and a flow deviation ring 21 are mounted. An internally threaded ring 24 is secured on top of cooling ring 19. Rotatable within ring 24 is an externally threaded adjustment ring 25, which has an annular inner edge 27 in contact with the outer surface of guide wall 11. Guide wall 11 is mounted with its lower end on cooling ring 19 as a continuation of the inner face 26 thereof. As shown in the partial top views of FIGS. 3 and 5, guide wall 11 is composed of a large number of trapezoid shaped blade elements 28 which are mounted in circular arrangement. The short and long parallel edges of blades 28 form the lower and upper edge respectively of guide wall 11. The blades 28 are mounted with their non-parallel edges in overlapping relationship, so that the blades 28 together form a closed annular guide wall 11 around the film tube. Each blade 28 is secured individually with its lower end to cooling ring 19. The blades 28 are normally thin metal blade elements which rest resiliently against annular edge 27 of the adjustment ring 25. A suitable material for the blades is soft steel or beryllium copper. By rotation of ring 25, for example by means of handle 29 secured thereto, the inner edge 27 in contact with the blades 28 is moved in a vertical direction, thereby allowing the upper ends of the blades 28 to move outwards by their resilience or causing them to move towards the film tube 13, depending on whether ring 25 is screwed into or out of the threaded ring 24. The cooling air supplied through air tube 16 is discharged through air slits 22 and 23 and then flows through the annular passage formed between the inner face 26 with the guide wall 11 and the surface of the film tube. This annular passage comprises a restriction 17 which acts as the throat of a venturi-tube, so that the stream of cooling air passing the throat at high velocity will create a zone of reduced pressure around the film tube in the throat, thereby causing or assisting in the expansion of the film tube. The dimensions and locations of the venturi throat are of great importance in the cooling of the film, and the apparatus of FIG. 2 allows the selection of a venturi throat from a wide and continuous range of designs. Adjustment ring 25 can be rotated during the extrusion process to find the most suitable shape for guide wall 11. In FIGS. 3–4 and 5–6 the position of blades 28 is shown in a low and a high position of the adjustment ring 25, respectively.

Figure 7:
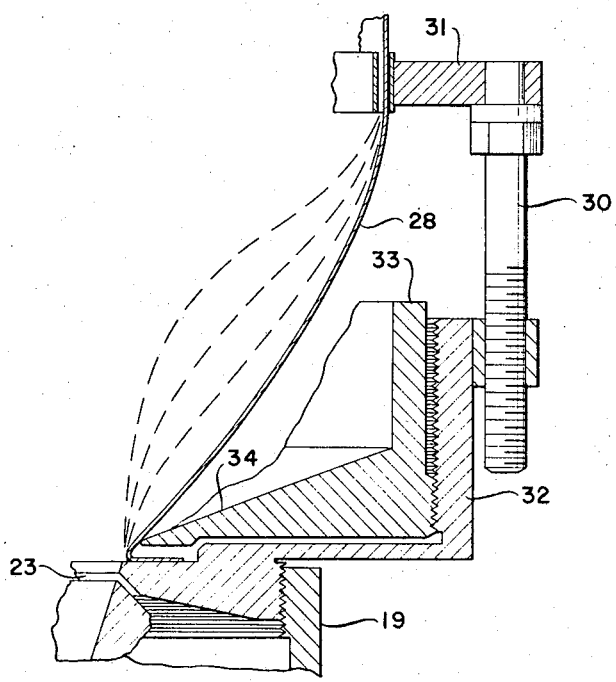

In the embodiment shown in FIG. 7, the blade elements 28 are secured with their lower ends to a top ring 32 which is threadably mounted within cooling ring 19. The upper ends of the blade elements 28 are fixedly secured to a ring plate 31 which is mounted by means of threaded bolts 30 to top ring 32. By screwing the bolts 30 in or out of top ring 32, the upper ends of the blade elements 28 are displaced in a vertical direction. In a fixed position of the upper ends of the blade elements 28, the contour thereof can be varied by screwing up or down an adjustment ring 33 which is threadably mounted in top ring 32. The resilient blade elements 28 are so mounted that they engage inner edge 34 of ring 33 in the lowest position thereof. By screwing up the adjustment ring 33 the blade elements 28 will then remain in contact with the inner edge 34 of the adjustment ring, and the blade elements will thereby assume a contour as indicated in FIG. 7 with dashed lines for various positions of the adjustment ring 33.

Figure 8:
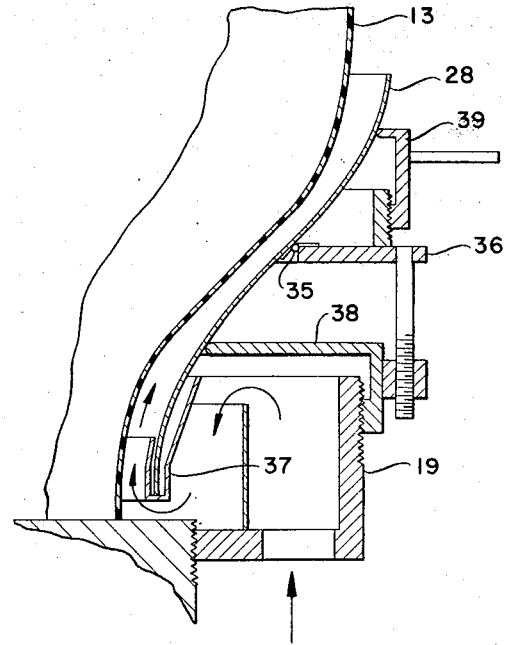

Yet another embodiment of the invention is shown in FIG. 8. In this construction the blade elements 28 are supported between their ends by hinges 35, allowing pivotable movement of the blade elements at this point in a vertical plane. Hinges 35 are carried by a ring plate 36. The lower ends of the blade elements 28 are slidably located within an annular trough 37 formed at the bottom of the inner face of cooling ring 19. The upper ends of the blade elements engage an upper adjustment ring 39; a lower adjustment ring 38 contacts the blades between their lower ends and the point connected to the hinges 35. Upper adjustment ring 39 is threadably mounted on ring plate 36, and, in turn, ring plate 36 is threadably mounted on lower adjustment ring 38. Finally, the lower adjustment ring 38 is threadably mounted on cooling ring 19. The direction of displacement of these adjustable parts 39, 36 and 38 is vertical. It will be noted that by adjustment of any of the adjustable parts 39, 36 or 38, the higher located members of these adjustable parts will also move up or down, whereas the lower positioned members will not be displaced. For example, when screwing up hinge plate 36, upper adjustment ring 39 will move with it, but lower adjustment ring 38 will maintain its position relative to cooling ring 19.

Figure 9:
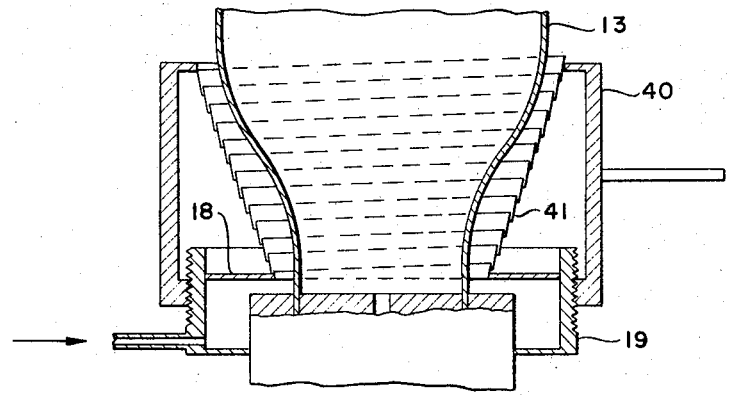

In FIG. 9 the guide wall in formed by a single element, viz a continuous spirally wound resilient metal strip 41. The various windings of the strip 41 overlap each other so that a closed wall is formed. The lower end of strip 41 is fixedly secured to top plate 18 of cooling ring 19, whereas the upper end of strip 41 is fixedly secured to an adjustment ring 40 which is threadably mounted on the cooling ring 19 for vertical displacement of the upper end of strip 41. Strip 41 is so mounted that on rotation of ring 40, causing the upper end of the strip 41 to move downward, strip 41 is wound up further, so that any tendency of strip 41 to become more loosely wound with spacings between the windings as a result of the vertical compression of the strip is compensated for by added windings to the strip 41. However, a slight spacing between two adjacent windings is generally tolerable.

Figure 10:
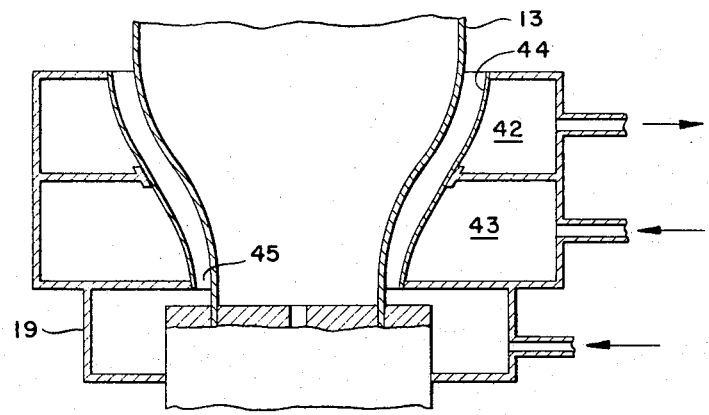

In FIG. 10 air chambers 42, 43 are mounted above each other on cooling ring 19. The inner wall of chambers 42, 43 facing the film tube is formed of a sheet 44 of flexible and elastic material such as rubber. Sheet 44 is secured at its top to the top plate of the upper chamber 42 and at its bottom to the bottom plate of the lower chamber 43. Sheet 44 is also secured to the common intermediate wall between the two chambers 42, 43. Each of chambers 42 and 43 is separately connected to a source of pressure, which may be super-atmospheric pressure or vacuum, as desired. By controlling the pressure in chambers 42 and 43, the contour of the sheet 44 forming the guide wall for the cooling air discharged from air slit 45 of the cooling ring can be varied.

Figure 11:
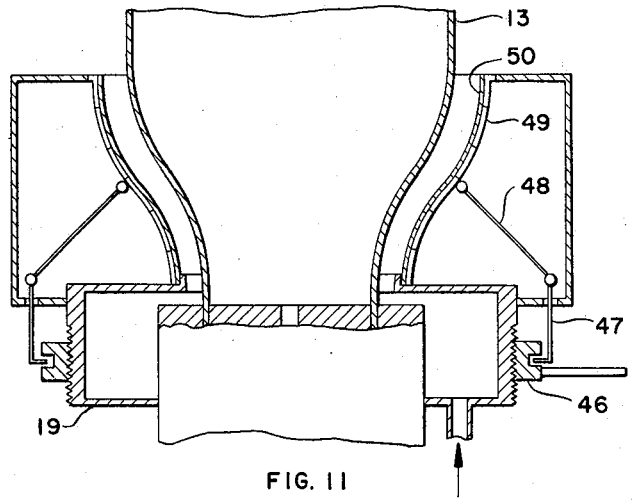

In FIG. 11 the guide wall is also formed by a flexible and elastic sheet 50 which is secured at its outer face at regular intervals over its circumference to a series of resilient strips 49 extending in vartical planes. The lower ends of strips 49 are fixed in relationship relative to cooling ring 19. Between these two ends, strips 49 are hingeably connected to one end of swivel rods 48, of which the other ends are hingeably secured to vertically displaceable action rods 47. The hinges at both ends of swivel rods 48 allow pivoting movement thereof in a vertical plane. Action rods 47 are slidably mounted with their lower ends in a horizontal annular groove of an adjustment ring 46 which can be screwed vertically up or down on cooling ring 19. The rods 47 do not rotate with the ring 46 but move up or down therewith, thereby moving the rods 48 to vary the shape of the sheet 50.

Various embodiments of the invention have been shown in the drawing, but it will be clear that many other designs are possible, for example those combining the features of the cooling devices shown in the various figures. Thus the guide wall may be fixedly mounted at its lower and/or top end, or between these ends. The guide wall may be hingeably secured to vertically movable adjustment members, as in FIG. 8, or to pivotable arms, as in FIG. 11. The invention is not limited to any particular form of adjustment means.

It should be understood that in the constructions shown in the drawings, parts not indispensible for a good understanding of the invention have been omitted; this includes, for example, insulation means on the extrusion die for avoiding direct contact of the cooling fluid with this die.

I claim as my invention:

1. In an apparatus for preparing self-sustained plastic film comprising
   a die having an annular orifice,
   means to extrude a molten thermoplastic mass through said die orifice to form seamless tubing,
   means to continuously withdraw said tubing from said die orifice,
   means to maintain a substantially constant bubble of a gaseous medium in a section of said tubing extending from said die orifice, including means to inflate and means to collapse said tubing, and
   means to supply a cooling fluid in the form of a gaseous stream encircling the exterior surface of said inflated tubing in the vicinity of said extrusion orifice,
   the improvement comprising
   adjustable annular guide means adapted to contain said stream of cooling fluid flowing between said guide means and said bubble, concurrently with said bubble, and
   shape-adjusting means adapted to act on said adjustable guide means to vary the shape thereof in a manner which varies the cross section of the annulus defined by said bubble and said guide means.

2. In an apparatus according to claim 1, the improvement comprising
   adjustable annular guide means mounted concentrically with said annular die and with a cooling ring adapted to provide said gaseous stream of cooling fluid, said guide means being shaped to define a restricted passage between itself and said bubble,
   shape-adjusting means adapted to vary the position of an adjustable portion of said guide means without varying the coaxial relationship between said guide means and said annular die and cooling ring and without affecting the size and position of said cooling ring.

3. Apparatus according to claim 2, in which the diameter of the adjustable portion of said guide means is variable by said shape-adjusting means.

4. Apparatus according to claim 3, in which said guide means is a guide wall composed of a plurality of resilient blade elements mounted side by side in the circumferential direction of the guide wall, each of said elements being operatively connected to said shape-adjusting means.

5. Apparatus according to claim 4, in which the ends of said blade elements nearest said cooling fluid supply means are mounted in fixed relation relative thereto, and intermediate points of said blade elements are in slidable engagement with a contacting member of said shape-adjusting means, the contacting member being displaceable in the axial direction of the guide wall.

6. Apparatus according to claim 5, in which said blade elements are hingeably secured to an adjustment member of said shape-adjusting means, said adjustment member being displaceable in the axial direction of said guide wall.

7. Apparatus according to claim 6, in which said blade elements are hingeably secured to said adjustment member at a location between a concave and a convex curved portion of said blade element.

8. Apparatus according to claim 3, in which said guide means comprises a spirally wound resilient strip of material of which the end nearest said cooling fluid supply means is mounted fixedly relative thereto and of which the other end is secured to a ring member of said shape-adjusting means which is threadably mounted for displacement of said ring member in the axial direction of said guide means.

9. Apparatus according to claim 2, in which said guide means is formed by wall members of at least two superimposed annular chambers, said wall members being flexible and elastic, and said annular chambers each being in communication with means for varying the pressure therein.

10. Apparatus according to claim 2, in which said guide means comprises a flexible and elastic sheet which is secured to a plurality of support elements extending in axial planes of said guide means in regular arrangement around the circumference thereof, the support elements being hingeably connected to an adjustment member of said shape-adjusting means, said adjustment member being displaceable in the axial direction of said guide means.

References Cited

UNITED STATES PATENTS

| | | | |
|---|---|---|---|
| 3,068,516 | 12/1962 | Hofer | 18—145 XR |
| 3,074,108 | 1/1963 | Wiley et al. | 18—145 |
| 3,167,814 | 2/1965 | Corbertt | 18—143 |
| 3,265,789 | 8/1966 | Hofer | 18—145 XR |

WILLIAM J. STEPHENSON, Primary Examiner